F. H. & R. H. BACHMAN.
ANTISLIPPING DEVICE.
APPLICATION FILED MAY 4, 1916.

1,209,103.

Patented Dec. 19, 1916.

Inventors
Frank H. Bachman
Reuben H. Bachman
By Watson E. Coleman
Attorney

UNITED STATES PATENT OFFICE.

FRANK H. BACHMAN AND REUBEN H. BACHMAN, OF ALLENTOWN, PENNSYLVANIA.

ANTISLIPPING DEVICE.

1,209,103.  Specification of Letters Patent.  Patented Dec. 19, 1916.

Application filed May 4, 1916. Serial No. 95,421.

*To all whom it may concern:*

Be it known that we, FRANK H. BACHMAN and REUBEN H. BACHMAN, citizens of the United States, residing at Allentown, in the county of Lehigh and State of Pennsylvania, have invented certain new and useful Improvements in Antislipping Devices, of which the following is a specification, reference being had to the accompanying drawings.

This invention relates to certain improvements in anti-slipping devices for wheels, and it is an object of the invention to provide a device of this general character having novel and improved means whereby the same may be readily and effectively applied to a wheel and whereby the device includes a plurality of yieldably connected members in order to afford a means for relieving the motive power of a vehicle from the shocks or jars incident to the use of the device.

The invention consists in the details of construction and in the combination and arrangement of the several parts of our improved anti-slipping device whereby certain important advantages are attained and the device is rendered simpler, less expensive and otherwise more convenient and advantageous for use, all as will be hereinafter more fully set forth.

The novel features of the invention will hereinafter be definitely claimed.

In order that our invention may be the better understood, we will now proceed to describe the same with reference to the accompanying drawings, wherein—

Figure 1:
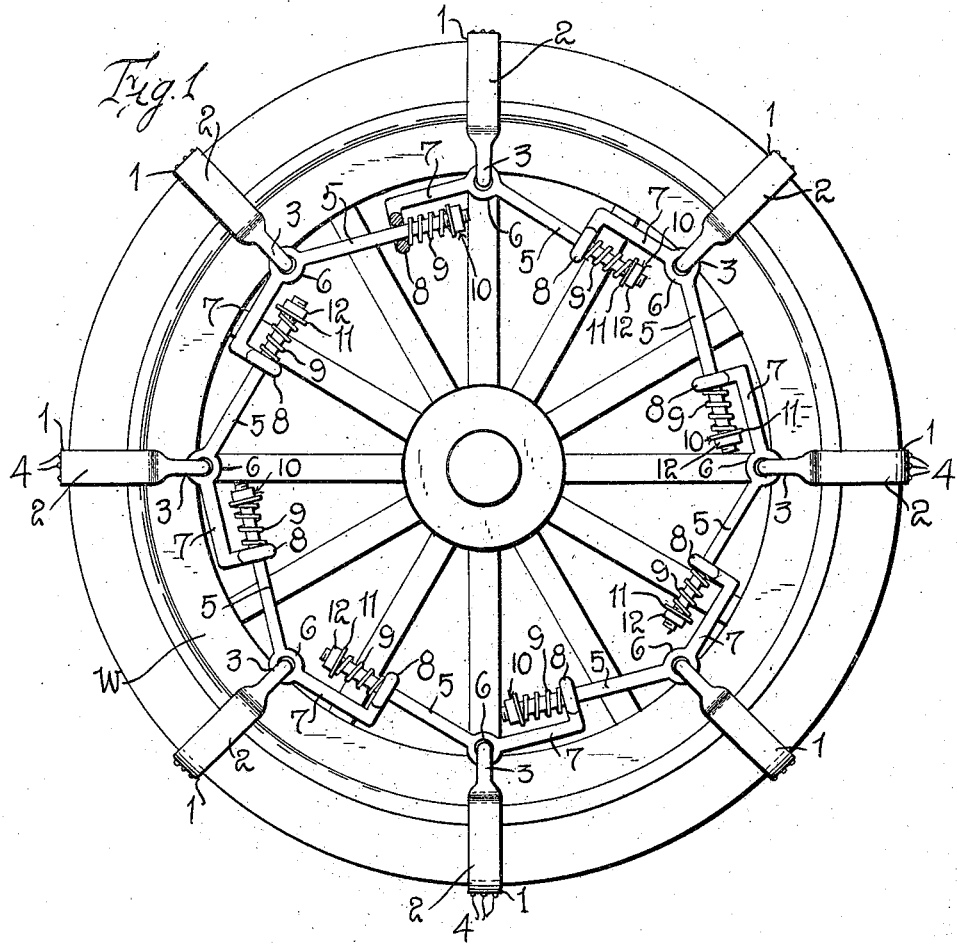
Figure 2:
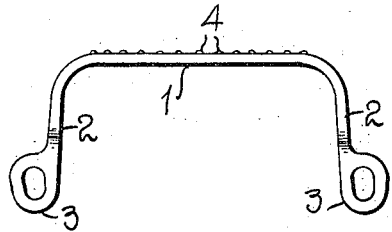
Figure 3:
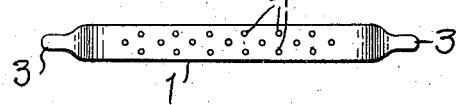

Figure 1 is a view in elevation with parts in section of an anti-slipping device constructed in accordance with an embodiment of our invention and in applied position; Fig. 2 is a view in side elevation of one of the tread members herein employed; and Fig. 3 is a view in top plan of a tread member as herein disclosed.

As disclosed in the accompanying drawings, W denotes a wheel of any ordinary or preferred type and with which our improved anti-slipping device is adapted to be employed.

As herein embodied, our improved anti-slipping device comprises a plurality of tread members 1 adapted to bridge the tread of the wheel W and having its extremities terminating in the inwardly disposed extensions 2 and provided with the eyes 3. The outer faces of the tread members 1 may be provided with any suitable means as indicated at 4 to afford an anti-skidding means.

Coacting with each extension 2 of a member 1 is a bar 5 provided with an eye 6 whereby a pivotal connection is afforded with the extension 2. The pivoted end of the bar 5 is provided with an extension 7 arranged on a predetermined angle relative to the bar 5 and terminating in an inwardly disposed perforate ear 8 through which an adjacent bar 5 is adapted to be loosely directed. The second bar 5 is encircled by the spring 9 interposed between the ear 8 and the stop 10 threaded upon the second bar 5, said stop 10 as herein embodied, including a conventional washer 11 and an ordinary nut 12.

It will be perceived that the connection between an extension 7 and a bar 5 permits a certain degree of relative movement between the tread members 1, whereby the shocks or jars incident to travel are to a certain degree absorbed. This is of a particular advantage especially as such absorption of shock is of material benefit to the motive power of a vehicle with which our devices are employed.

From the foregoing description, it is thought to be obvious that an anti-slipping device constructed in accordance with our invention is of an extremely simple and comparatively inexpensive nature and is particularly well adapted for use by reason of the convenience and facility with which it may be assembled, and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice.

We claim:

1. An anti-slipping device comprising a plurality of tread members, bars pivotally engaged with the extremities of the tread members, each of said bars being provided with an extension terminating in a perforate ear, an adjacent bar being loosely disposed through said ear, a stop carried by the portion of the bar disposed beyond the ear, and and expansible member interposed between said stop and ear.

2. An anti-slipping device comprising a plurality of tread members, bars pivotally engaged with the extremities of the tread members, each of said bars being provided with an inwardly disposed perforate ear, a bar of an adjacent tread member being loosely disposed through said ear, and an expansible member coacting with the ear and the outer portion of the bar disposed through the ear.

3. An anti-slipping device comprising a plurality of tread members, bars pivotally engaged with the extremities of the tread members, each of said bars being provided with an extension terminating in a perforate ear, a bar of an adjacent tread member being loosely disposed through said ear, and an expansible member interposed between said ear and the outer portion of the bar disposed through the ear.

In testimony whereof we hereunto affix our signatures in the presence of two witnesses.

FRANK H. BACHMAN.
REUBEN H. BACHMAN.

Witnesses:
  ROBERT G. HELINGY,
  ALVIN M. BACHMAN.